United States Patent
Shubrick et al.

(10) Patent No.: US 11,128,549 B1
(45) Date of Patent: Sep. 21, 2021

(54) ROUTING FOR REMOTE ELECTRONIC DEVICES

(71) Applicant: MASSACHUSETTS MUTUAL LIFE INSURANCE COMPANY, Springfield, MA (US)

(72) Inventors: Payton Shubrick, Springfield, MA (US); Joseph Fortini, Springfield, MA (US); Joseph Calabrese, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 0 days.

(21) Appl. No.: 16/927,491

(22) Filed: Jul. 13, 2020

(51) Int. Cl.
*H04L 12/26* (2006.01)
*H04L 12/24* (2006.01)
*H04L 12/58* (2006.01)

(52) U.S. Cl.
CPC ........ *H04L 41/5041* (2013.01); *H04L 43/045* (2013.01); *H04L 43/0876* (2013.01); *H04L 51/046* (2013.01)

(58) Field of Classification Search
None
See application file for complete search history.

(56) References Cited

U.S. PATENT DOCUMENTS

| 10,652,739 | B1* | 5/2020 | Lilley | H04W 4/00 |
|---|---|---|---|---|
| 2011/0096673 | A1* | 4/2011 | Stevenson | H04M 7/0024 370/252 |
| 2012/0275589 | A1* | 11/2012 | Meng | H04M 3/2227 379/265.02 |
| 2013/0176413 | A1* | 7/2013 | Lowry | H04M 3/5175 348/77 |
| 2014/0280959 | A1* | 9/2014 | Bauer | H04L 67/101 709/226 |
| 2015/0142933 | A1* | 5/2015 | Nowak | H04L 41/0823 709/221 |
| 2016/0212063 | A1* | 7/2016 | Calvo | H04L 63/102 |
| 2017/0005899 | A1* | 1/2017 | Pendleton | H04L 43/16 |
| 2021/0006654 | A1* | 1/2021 | Gramacho | H04M 3/4933 |

* cited by examiner

*Primary Examiner* — Joshua Joo
(74) *Attorney, Agent, or Firm* — Foley & Lardner LLP

(57) ABSTRACT

Methods and systems described herein describe a central server that continuously monitors network connectivity of remote computers operated by remote employees. When a customer establishes an electronic communication session with the server (e.g., call or chat session), the server identifies one or more applications to be executed to satisfy the customer's requests. The server then calculates a network traffic value threshold corresponding to a minimum network connectivity attributes needed to execute the identified applications. The server then route the customer's electronic communication session to an agent whose remote computer satisfies the network traffic value threshold.

20 Claims, 5 Drawing Sheets

ROUTING FOR REMOTE ELECTRONIC DEVICES

TECHNICAL FIELD

The subject matter described herein relates generally to electronic routing systems, and more specifically directed towards network communication with remote electronic devices.

BACKGROUND

As the processing power of computers allow for greater computer functionality and the Internet technology era allows for interconnectivity between computing systems, many employees are able to work remotely, such as from a home-office. Conventionally, institutions that allow remote work typically utilize a server to route data to and from computing devices utilized by remote employees. These servers have become conduits for transmission and distribution of the data between customers, the institution's computing environments, and the remote employees.

However, conventional systems of routing data to remote employees have faced technical challenges. For instance, different employees may utilize different electronic devices having different computing resources. Furthermore, employees may use a local network at their remote location to receive and send data to the server and/or directly to the customers. For instance, a remote employee may connect over Wi-Fi to his/her personal home Internet connection to connect to the server and send/receive data from the server (e.g., receive a call that is routed by the server and/or access an application to satisfy a request transmitted by the institution's server). Poor connections can result in dropped calls, pauses during calls, delays, and other issues. Therefore, network connectivity issues that are typically not controlled by the institution's server can vastly affect the employee's efficiency and ability to work.

SUMMARY

For the aforementioned reasons, what is therefore desired is an intelligent routing system for forecasting network connectivity and computing resources needed and routing requests based on each remote employee's unique network conditions. The intelligent routing system described herein is a forward-looking resource management system, which may dynamically revise workflow based on employee's network capacity and expected changes of computing resources. The intelligent routing system described herein may proactively adjust allocation of workflow (e.g., call routing), such that resource-heavy requests are allocated to employees who enjoy better connections.

The intelligent routing system may include a server that monitors network connectivity of each employee (and his or her connected electronic devices). The server may analyze client requests to identify resources needed to satisfy such requests. The server may also route the requests to the most appropriate employee by establishing a remote connection between the customer and the remote employee.

In an embodiment, a method comprises generating, by a server for each remote electronic device within a set of remote electronic devices, a network traffic value corresponding to a volume and speed of data packets communicated between a network and each remote electronic device via at least one network routing device; upon establishing an electronic communication session with a customer device, receiving, by the server from the customer device, an electronic request to be routed to at least one electronic device within the set of electronic devices; identifying, by the server, at least one application to be executed to satisfy the electronic request; calculating, by the server, network traffic value threshold associated with the identified at least one application; identifying, by the server, a first remote electronic device having a network traffic value that satisfies the calculated network traffic threshold; routing, by the server, the electronic request to the first remote electronic device.

In another embodiment, a system comprises a server comprising a processor and a non-transitory computer-readable medium containing instructions that when executed by the processor causes the processor to perform operations comprises generate, for each remote electronic device within a set of remote electronic devices, a network traffic value corresponding to a volume and speed of data packets communicated between a network and each remote electronic device via at least one network routing device; upon establishing an electronic communication session with a customer device, receive, from the customer device, an electronic request to be routed to at least one electronic device within the set of electronic devices; identify at least one application to be executed to satisfy the electronic request; calculate network traffic value threshold associated with the identified at least one application; identify a first remote electronic device having a network traffic value that satisfies the calculated network traffic threshold; and route the electronic request to the first remote electronic device.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1:
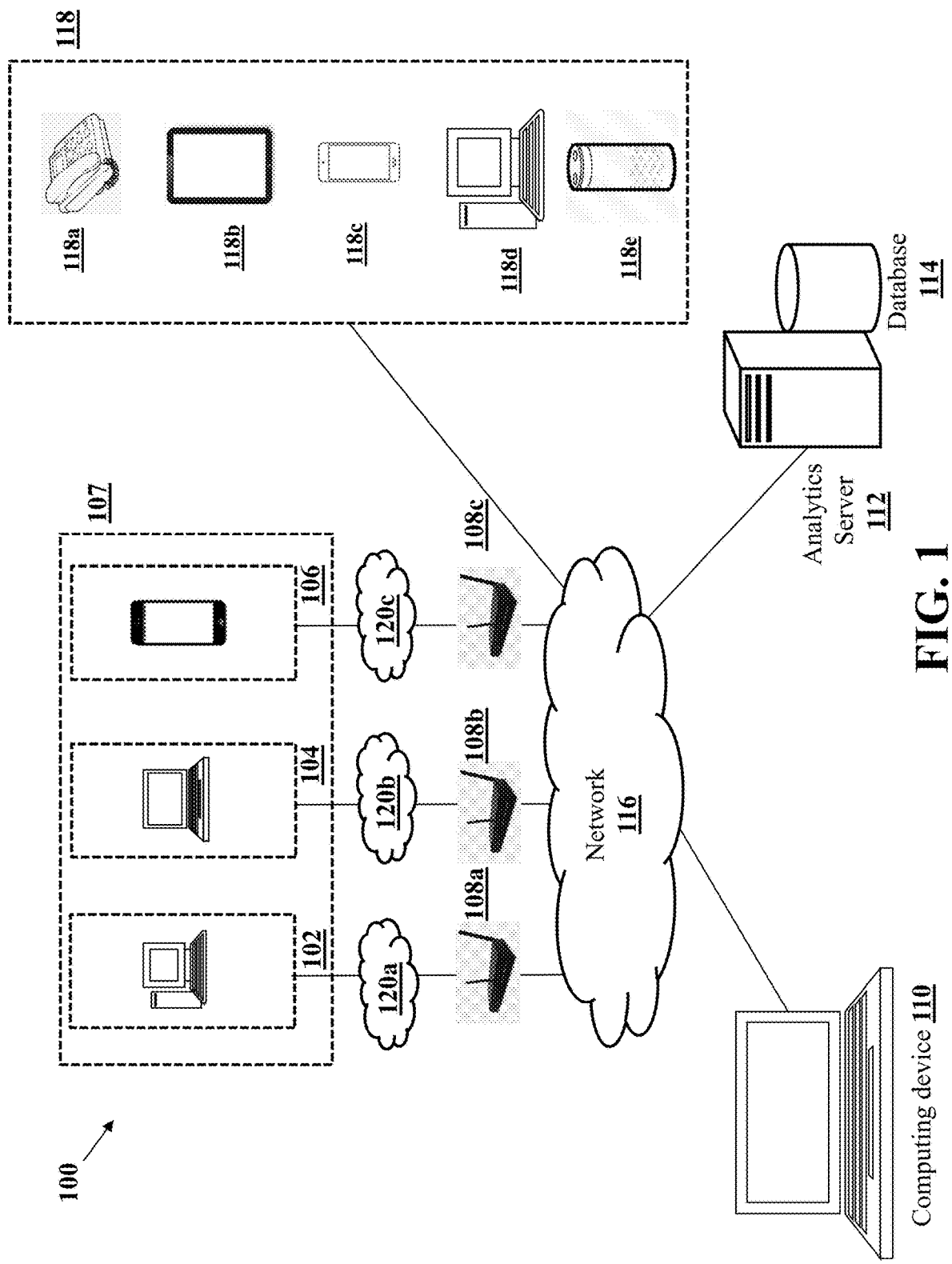
FIG. 1 illustrates various components of an intelligent routing system, in accordance with an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As described herein, systems and methods can intelligently route by forecasting network connectivity and computing resources needed and then routing requests based on each remote employee's unique network conditions. The dynamic routing system described herein is a forward-looking resource management system that dynamically adjusts workflow based on employee's network capacity and expected changes of computing resources. The intelligent routing system described herein may proactively adjust allocation of workflow (e.g., call routing), such that resource-heavy requests are allocated to employees who have better connections. For example, in a call center configuration where each customer service representative receives calls from a home office, the systems and methods can determine which remote representatives have an adequate connection and route to only those representatives with a minimum threshold traffic value. The systems and methods may also dynamically adjust the routing based on behavior, patterns, and other attributes of the remote devices.

FIG. 1 illustrates various components of an intelligent routing system 100. An institution may employ the intelligent routing system 100 to optimize data routing to remote electronic devices. The intelligent routing system 100 may include a first electronic device 102 operated by a first employee, second electronic device 104 operated by a second employee, and a third electronic device 106 operated by a third employee (collectively electronic devices 107). The intelligent routing system 100 may also include a first network routing device 108a providing network connectivity to the electronic device 102, a second network routing device 108b providing network connectivity to the electronic device 104, a third network routing device 108c providing network connectivity to the electronic device 106 (collectively network routing devices 108). The network routing devices 108 connect the electronic device 107 to the network 116. The intelligent routing system 100 may also include the computing device 110, analytics server 112, user devices 118, and databases 114.

The intelligent routing system 100 may operate in a context of computer-executable instructions, such as program modules. A server computer, such as the analytics server 112 may execute the program modules. The program modules may include programs, objects, components, data structures, etc. that perform particular tasks described herein. The features of the intelligent routing system 100 may function either in a computing device or in a distributed computing environment, where the processing devices may perform the tasks described herein. In a distributed computing environment, program modules may be located in both local and remote computer storage media including memory storage devices.

The features depicted in the system 100 may communicate with each other over the network 116. The network 116 may include, but is not limited to, a private local area network, a virtual private network, a public local area network, a wireless local area network, a metropolitan area network, a wide-area network, and Internet. The network 116 may further include both wired and wireless communications, according to one or more standards, via one or more transport mediums. The communication over the network 116 may occur in accordance with various communication protocols, such as, a transmission control protocol and an internet protocol, a user datagram protocol, and an institute of electrical and electronics engineers communication protocols. The network 116 may further include wireless communications, according to Bluetooth specification sets, or another standard or proprietary wireless communication protocol. The network 116 may further include communications over a cellular network, including, for example, a global system for mobile communications, code division multiple access, and enhanced data for global evolution network.

The intelligent routing system 100 may operate in a computing environment where the analytics server 112 may execute various network data monitoring and management tasks. The database 114 and application programs associated with the analytics server 112 may be stored and executed on local computing resources. The analytics server 112 may locally query the database 114 to retrieve the network data records associated with the electronic devices 107 and/or the network routing devices 108 over a predefined periods. The database 114 may store a summary of the network data records. The summary of the network data records may be indexed according to an identifier associated with the electronic devices 107 and/or the network routing devices 108. The analytics server 112 may analyze and evaluate the network data records to intelligently route various electronic requests to the electronic devices 107. For instance, the analytics server 112 may generate various trends and identify historical network connectivity attributes of the electronic devices 107. The analytics server 112 may present the network data records and the network capacity values on an interactive graphical user interface of the computing device 110.

The intelligent routing system 100 may operate in a cloud-computing environment. The analytics server 112 may execute a network data management software application to intelligently transmit electronic requests to the electronic devices 107. The network data management software application and the computing device 110 data and application programs may be stored and executed on a remote cloud-based analytics server 112 accessed over a network cloud. In the cloud-computing environment, a web browser executing on the computing device 110 may interface with an application program corresponding to the network data management software application. The remote cloud-based analytics server 112 may execute the network data management software application. Utilizing a browser executing on the computing device 110, a user may generate the request. The computing device 110 may transmit the request to the remote cloud-based analytics server 112 via the application program.

The remote cloud-based analytics server 112 may monitor the network data records associated with the request and/or query the database 114 to retrieve the network data records associated with the request. The remote cloud-based analytics server 112 may analyze and evaluate the network data records to intelligently route data accordingly. The remote cloud-based analytics server 112 may present the network data records and the network capacity values on the interactive graphical user interface of the computing device 110.

The analytics server 112 may be any computing device capable of performing the actions described herein. For instance, the analytics server 112 may include a processing unit, and a non-transitory machine-readable storage medium. The processing unit may include a processor with a computer-readable medium, such as a random access memory coupled to the processor. The analytics server 112 may be executing algorithms or computer executable program instructions, which may be executed by a single processor or multiple processors in a distributed configuration. The analytics server 112 may be configured to interact with one or more software modules of a same or a different type operating within the system 100.

Non-limiting examples of the processor may include a microprocessor, an application specific integrated circuit, and a field programmable object array, among others. The analytics server 112 is capable of executing data processing tasks, data analysis tasks, and valuation tasks. Non-limiting examples of the analytics server 112 may include a desktop computer, a server computer, a laptop computer, a tablet computer, and the like. For ease of explanation, the FIG. 1 depicts a single server computing device functioning as the analytics server 112. However, some embodiments may include a plurality of server computing devices capable of performing various tasks described herein.

In operation, multiple electronic devices 107 may transmit and receive data packets from the network 116 through the network routing devices 108. For instance, a user operating the electronic devices 107 (e.g., remote employees) may execute an application (associated with the analytics server 112) and may use the network routing devices 108 to receive and send data packages to the analytics server 112. The routing devices 108 may utilize local networks 120*a*-120*c* (collectively local networks 120) to connect the electronic devices 107 to the network 116 (Internet).

Each local network 120 may include, but not limited to, a private local area network, a virtual private network, a public local area network, a wireless local area network (e.g., Wi-Fi), a metropolitan area network, a wide-area network, and Internet. Each local network 120 may further include both wired and wireless communications, according to one or more standards, via one or more transport mediums. The communication over each local network 120 may occur in accordance with various communication protocols, such as, a transmission control protocol and an internet protocol, a user datagram protocol, and an institute of electrical and electronics engineers communication protocols. The local network 120 may further include wireless communications, according to Bluetooth specification sets, or another standard or proprietary wireless communication protocol.

The analytics server 112 may periodically monitor network traffic values associated with the network routing devices 108 and/or the electronic devices 107. The analytics server 112 may periodically monitor the network traffic values for various predetermined intervals of time. The network traffic values may correspond to at least a volume and speed of data packets transmitted from the network 116 to the electronic devices 107 through the network routing devices 108 (and sometimes through the local networks 120).

The network traffic values may correspond to at least a frequency and/or speed of data packets transmitted from the network 116 to the electronic devices 107 through the network routing devices 108. The network traffic values may correspond to at least a time duration (or timestamp) of data packets transmitted from the network 116 to the electronic devices 107 through the network routing devices 108. The analytics server 112 may store the network traffic values and time stamps associated with receipt and transmission of the data packets at addresses of the electronic devices 107 in the database 114.

Electronic devices 107 may be computing devices having a processor. The electronic devices 107 may further include a processing unit and a non-transitory machine-readable storage medium. The processing unit may include a processor with a computer-readable medium, such as a random access memory coupled to the processor. The electronic devices 107 may execute algorithms or computer executable program instructions, which may be executed by a single processor or multiple processors in a distributed configuration. The electronic devices 107 may interact with one or more software modules of a same or a different type operating within the intelligent routing system 100.

Non-limiting examples of the processor may include, but not limited to, a microprocessor, an application specific integrated circuit, and a field programmable object array, among others. The electronic devices 107 may be capable of executing various tasks, such as data processing tasks and data analysis tasks. Non-limiting examples of the electronic devices 107 may include a desktop computer, a server computer, a laptop computer, a tablet computer, a mobile phone, a watch, and the like.

Network routing devices 108 may be networking electrical devices. A networking electrical device may be a hardware and/or software, which may enable communication and interaction between the electronic devices 107 on the network 116. The networking electrical device may facilitate transmission of the packets of the data within the network 116. Non-limiting examples of the network routing device 108 may include a router, a switch, a hub, a network bridge, a gateway, a modem, and a repeater. Even though the network routing devices 108 are depicted at as physical hardware devices, these features may also be software modules enabling communication between the electronic devices 107 and the network 116.

The network routing devices 108 are located between the electronic devices 107 located at different locations and the network 116. The network routing devices 108 may forward data packets between the electronic devices 107 via the network 116. The network routing devices 108 may perform functions of directing traffic of the data packets between the electronic devices 107 via the network 116. The data packets transmitted from one of the electronic devices 107 may be forwarded from a first network routing device 108*a* to a second network routing device 108*b* through the network 116 until the data packets reach the destination.

The network routing devices 108 may execute a packet switching mechanism to forward the data packets between the electronic devices 107 via the network 116. The data packets may include network protocol packets. Each network protocol packet may contain a preamble. The preamble of the network protocol packet may contain sender electronic devices 107 addresses and recipient electronic devices 107 addresses. The network protocol packets may form a data stream over the network routing devices 108, which may be transmitted in the network 116 from the sender electronic devices 107 to the recipient electronic devices 107.

The computing device 110 is any computing device comprising a processing unit. The processing unit may execute a software application or a web browser application. The software application network may be a graphical user interface displaying data retrieved and/or analyzed by the analytics server 112. The computing device 110 may include a processor with a computer-readable medium, such as a random access memory coupled to the processor. The computing device 110 may be running algorithms or computer executable program instructions, which may be executed by a single processor or multiple processors in a distributed configuration. The computing device 110 may interact with one or more software modules of a same or a different type operating within the intelligent routing system 100.

Non-limiting examples of the processing unit may include a microprocessor, an application specific integrated circuit, and a field programmable object array, among others. Non-limiting examples of the computing device 110 may include a server computer, a workstation computer, a tablet device, and a mobile device (e.g., smartphone). A user may operate the computing device 110 to view various graphical user interfaces (GUIs) described herein where the analytics server 112 presents data (in visual or other forms) indicating various metrics and attributes of the system 100. For ease of explanation, FIG. 1 shows a single computing device functioning as the computing device 110. However, some embodiments may include multiple computing devices capable of performing tasks described herein.

The computing device 110 may display an interactive graphical user interface on which the user may interact by means of an input device, such as a touch screen, a mouse, a keyboard, a keypad, among others. The interactive graphical user interface may collect data records from the database 114 and feed the data records to a user operating the computing device 110. The data records may include the data packets transmitted between the electronic devices 107 via the network 116 and the network routing devices 108, the network traffic values associated with the network routing devices 108, and the network capacity values associated with the network routing devices 108.

The computing device 110 may be operated by an administrator where the computing device 110 displays an interactive graphical user interface generated (e.g., hosted and/or updated) by the analytics server 112. The interactive graphical user interface may display a status of all the electronic requests being handled (e.g., requests being satisfied) by different electronic devices 107. The interactive graphical user interface may also display a network connectivity status of each electronic device 107. The administrator operating the interactive graphical user interface may manually instruct the analytics server 112 to route, stop routing, or revise routing patterns of electronic requests to different electronic devices 107. The analytics server may continuously monitor the status of electronic requests, computing resources and network connectivity of each electronic device 107, and other information gathered from features described in FIG. 1, and may update the interactive graphical user interface in real time or near real time.

The database 114 may be capable of storing data records in a plain format and an encrypted version. The data records may include information associated with the company associated with the analytics server 112 and/or any computing feature within the system 100 (e.g., a number of electronic devices 107, a type of electronic devices 107, data associated with the employees operating the electronic device 107, a description and a specification of electronic devices 107, the user profile records, data associated with the network routing devices 108, and the like.

The database 114 may be in communication with a processor of the analytics server 112, the electronic devices 107, the network routing device 108, and/or the computing device 110. The processor is capable of executing multiple commands of the intelligent routing system 100. The database 114 may be a part of the analytics server 112. Additionally or alternatively, the database 114 may be a separate component in communication with the analytics server 112. The database 114 may have a logical construct of data files and records, which may be stored in a non-transitory machine-readable storage media, such as a hard disk or memory, controlled by software modules of a database program (e.g., SQL), and a database management system that executes the code modules (e.g., SQL scripts) for various data queries and management functions.

User devices 118a-e (collectively user devices 118) may represent any electronic device configured to establish an electronic communication session with another electronic device. Non-limiting examples of electronic devices 118 may include a landline telephone 118a, a tablet 118b, a smart phone 118c, a desktop 118d, a voice activated assistant electronic device 118e, and the like. The analytics server 112 may use Internet and VoIP, public switched telephone network (PSTN), and/or cellular networks to establish electronic communication sessions between each of the electronic devices.

The analytics server 112 may use three general classes of telephonic networks (e.g., PSTN, cellular networks, and Internet and VoIP network) to establish a connection between the user devices 118 and the electronic devices. For clarity and brevity, these telephonic networks are not illustrated in FIG. 1. PSTN may be characterized as a circuit-switched telephony system establishing lossless connections and high fidelity audio. In some configurations, components of the cores of the PSTN may be replaced by internet protocol (IP) connections, but private links of PSTN may remain tightly controlled to ensure near-zero packet loss. The analytics server 112 may also use cellular networks (CDMA and/or GSM protocols) to establish a telephonic electronic session among different electronic devices. Like PSTN, cellular networks have a circuit-switched core, with portions that may be replaced by IP links. While these networks can have considerably different technologies deployed in their wireless interfaces, the cores of cellular networks may be similar to PSTN. Lastly, VoIP networks may run on top of IP links and generally share paths as other Internet-based traffic. The analytics server 112 may utilize a variety of existing methodologies to establish an electric communication session using VoIP.

The analytics server 112 may also utilize a variety of technologies and methodologies to establish electronic communication sessions among different electronic devices described herein. In addition to telephonic audio connections described above, the analytics server 112 may use homegrown or other chat applications where one or more electronic devices can transmit text or other media elements to each other. The analytics server 112 may also use the Internet and VoIP network to establish a videoconference among one or more electronic devices. In some configurations, the analytics server 112 may also use a third-party application to establish an electronic communication session among the electronic devices described herein.

In operation, the analytics server 112 may receive an electronic request from user device 118b where a customer operating the user device 118b calls a call center operated by the analytics server 112. The analytics server 112 analyzes the received call to identify a suitable remote employee (operating electronic device 102, 104, or 106) to receive the call and to satisfy the customer's request received via the user device 118b. Specifically, using methods and systems described below, the analytics server 112 identifies a customer request to be satisfied by one of the remote employees operating the electronic devices 107. Based on the identified request, the analytics server 112 may identify one or more applications to be executed to satisfy the identified request and a corresponding network connectivity threshold (e.g., minimum network speed required to execute the identified applications).

The analytics server 112 may then calculate a network traffic value for each electronic device 102, 104, and 106. As described herein, each electronic device 102, 104, and 106 uses network routing devices 108a, 108b, and 108c to connect to the network 116 (Internet) and to the analytics server 112. Each electronic device may also connect to a local network (e.g., third-party network provider) through which each electronic device is provided access to the network 116. The analytics server 112 may then transfer the electronic request from the user device 118b to one of the electronic devices 102, 104, or 106 based on the selected electronic devices network traffic values (corresponding to its download and upload speed) satisfying the network connectivity threshold. The traffic values may represent network bandwidth of the electronic device, which is the maximum rate of data transfer over a network, including download and upload speeds, in a given amount of time.

Figure 2:
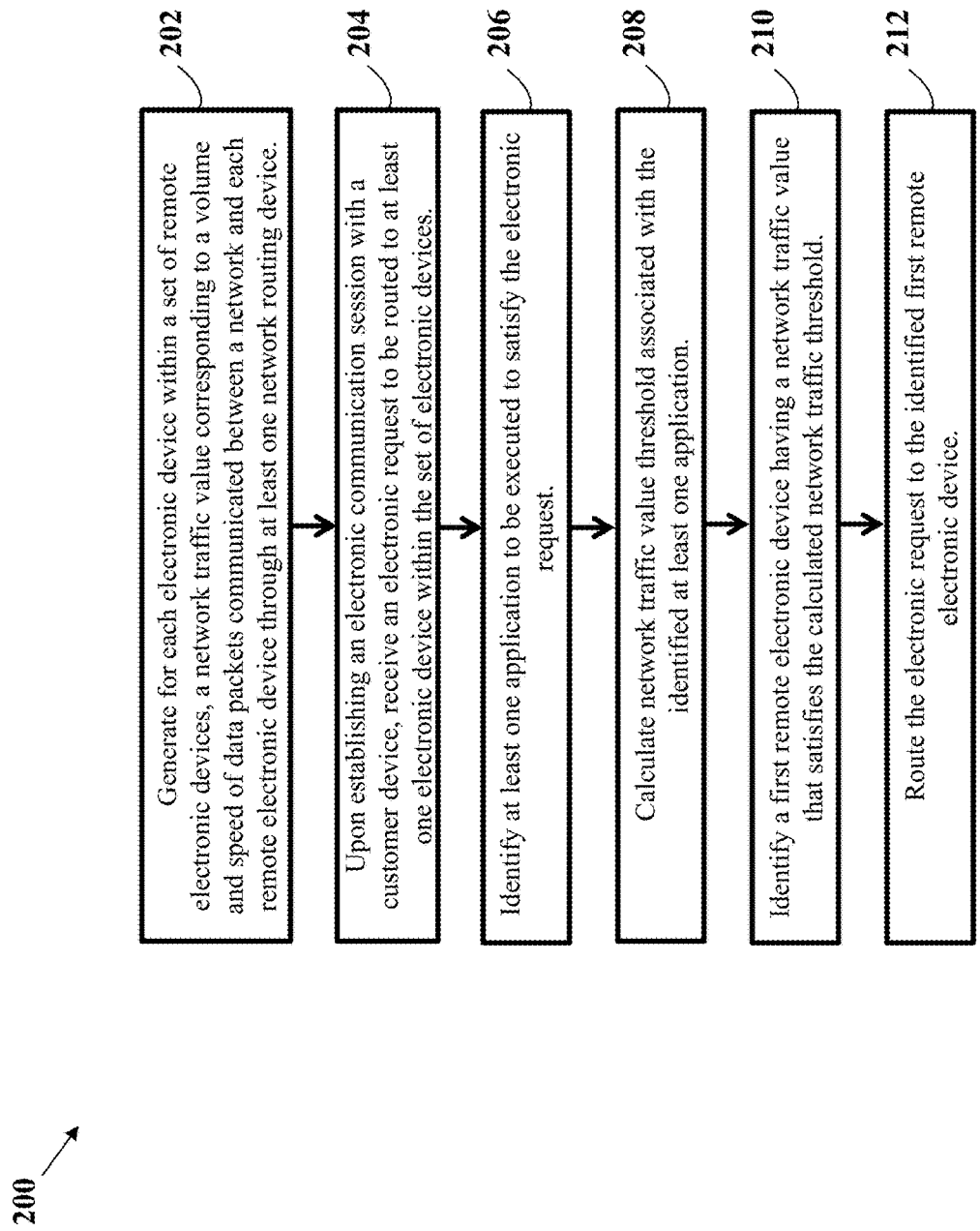
FIG. 2 illustrates operational steps executed by an intelligent routing system, in accordance with an embodiment.

FIG. 2 illustrates operational steps executed by an intelligent routing system, in accordance with an embodiment. The method 200 describes how a server, such as the analytics server described in FIG. 1, can monitor various attributes associated with remote electronic devices and dynamically route electronic requests and/or display an interactive graphical user interface (GUI) indicating various status of electronic devices and/or routing of electronic devices. Even though the method 200 is described as being executed by the analytics server, the method 200 can be executed by any server and/or locally within a user's computing device or as a browser extension. For instance, the steps of the method 200 may be locally performed at the remote electronic devices and or the network routing devices. Furthermore, other configurations of the method 200 may comprise additional or alternative steps, or may omit one or more steps altogether. In some configurations, the steps of the method 200 may be executed in a different order than illustrated.

At step 202, the analytics server may generate for each electronic device within a set of electronic devices, a network traffic value corresponding to a volume and speed of data packets communicated between a network and each electronic device through at least one network routing device. The analytics server may identify a network traffic value for a set of remote electronic devices. The analytics server may use various methodologies to monitor connectivity of all (or a predetermined portion of) remote devices.

The analytics server may periodically ping each device and execute analysis of Internet/network access performance metrics, such as connection data rate and latency. The analytics server may measure the data throughput (speed) and latency (connection delay) of an Internet connection against one or more servers providing connection to each device. The analytics server may measure the data rate for the download direction (e.g., from the server/Internet to the user computer) and the upload data rate (e.g., from the user's computer to the server/Internet).

The analytics server may instruct a network monitoring software protocol previously installed on each electronic device to measure various connectivity attributes. The monitoring software protocol may perform the analysis as a background process and without interfering with the employee's workflow. In some embodiments, the software protocol may perform a HTTP protocol and/or transmission control protocol (TCP) to identify network/connectivity attributes.

The analytics server may then generate a network traffic value for each remote electronic device based on the data throughput (download and upload speed) and/or latency. The analytics server may use any scoring algorithm to calculate the network traffic value. For instance, the analytics server may weigh the identified attribute equally or attribute more weight to speed than latency or vice versa. The network traffic value may indicate the efficiency of each electronic device's network connection. As will be described below, the analytics server may use the network traffic value to allocate workflow and/or route electronic communication to the electronic devices.

At step 204, upon establishing an electronic communication session with a customer device, the analytics server may receive an electronic request to be routed to at least one electronic devices within the set of electronic devices. The analytics server may receive one or more electronic requests to be satisfied by one or more electronic devices within the set of remote electronic devices. An electronic request may be any request received by the analytics server or any other server associated with the analytics server. Non-limiting examples of electronic requests may include calls received by the analytics server and requests received via an electronic platform (e.g., website) hosted by or otherwise associated with the analytics server. For instance, an electronic request may refer to a request to have a chat session with an employee operating one of the remote electronic devices.

In a non-limiting example, an electronic request may refer to a call received by the analytics server. For instance, the analytics server may receive a call from a user/customer. The analytics server may use various electronic communication protocols (e.g., PSTN or VoIP) and other communication protocols to establish an electronic communication session with a user device. For instance, the analytics server may receive a call from a customer device (e.g., phone call). In another embodiment, the analytics server may receive a request to from a user computer device to be routed to an employee. For instance, a user may transmit a request to the analytics server, the request indicating that the user is interested to be connected with an employee/agent via an electronic communication channel (e.g., electronic chat session and/or telephonic communication).

At step 206, the analytics server may identify at least one application to be executed to satisfy the electronic request. In order to route the electronic request to the appropriate employee, the analytics server may determine a possible request to be satisfied during the requested electronic communication session. The analytics server may use attribute of the user and/or the received request (step 204) to determine one or more applications to be executed to satisfy the user's request. In some embodiments, the analytics server may first identify one or more requests to be satisfied for the electronic requests received. The analytics server then identifies one or more applications to be used to satisfy the identified requests.

The analytics server may use multiple methods to identify the applications based on the request received (or anticipated request to be received) in step 204. The analytics server may use various attributes received from the user/customer initiating the electronic request. For instance, the analytics server may utilize an interactive voice response (IVR). When a customer initiates a call to the analytics server, the IVR system may request a reason for the customer's call (e.g., technical support, service interruptions, or advisor request). The analytics server may retrieve this data from the IVR system and identify the customer's request.

Additionally or alternatively, the analytics server may query the customer's account to anticipate a reason for the customer initiating communication with the analytics server. For instance, the analytic server may query the customer's account and determine a reason for the customer's communication based on the customer's account attributes. For instance, the analytics server may determine that the user has recently (e.g., within a predetermined time threshold) has had a change in his/her account (e.g., customer's balance has fallen below a threshold, and/or customer's service has been interrupted). As a result, the analytics server may determine that the customer has initiated the electronic communication to discuss the above-described issues. For instance, when a call is received, the analytics server identifies an account associated with the phone number (or other identifiers, such as the IP address or MAC address of the customer). The analytics server may then query the customer's account to identify recent changes to the customer's account.

Additionally or alternatively, the analytics server may use the customer's previous calls to identify a problem associated with the customer's account. For instance, the analytics server may query and retrieve previous contacts (e.g., calls, chats, or other communications) made by the customer. The analytics server may then analyze reasons for previous contacts and may determine that the reason for the recent contact is similar to the customer's previous contact. For instance, when the analytics server receives an electronic request via a phone call, the analytics server may identify the customer's account based on the customer's phone number and/or other identifiers. The analytics server may then determine that the customer has contacted the entity (analytics server) twice in the past week to discuss service interruptions. As a result, the analytics server may determine that the customer's reason for calling is associated with service interruptions.

Additionally or alternatively, the analytics server may query and retrieve transcription of the customer's reasons for establishing an electronic communication session with the analytics server. Before being routed to an employee, the customer may be required to describe the problem and provide a brief explanation of the reasons for calling. The customer may verbally provide this description. In some embodiments, the customer may electronically provide this description in a chat session with another employee and/or a chatbot executed by the analytics server. The analytics server may retrieve and transcribe the customer's description and may determine one or more reasons for the customer's call based on various keywords within the customer's description. For instance, the analytics server may execute a natural language processing model to identify a transcript of the customer's chat session. If the customer's description includes the phrase "service interruption," the analytics server assumes that the customer is contacting the analytics server due to a service interruption.

Upon identifying a request to be satisfied for the customer who has initiated the electronic communication (or issued the received electronic request), the analytics server may identify one or more applications to be used to satisfy the customer's request. The analytics server may use predetermined rules to identify one or more applications for satisfying the customer's request. For instance, the analytics server may retrieve a table including all existing applications and their corresponding attributes (e.g., name of each application executed by remote employees and various problems solved by each application). As used herein, application may refer to any software solution executing various computer code/script that can be executed by a remote employee using his/her electronic device. Employees may execute applications to access and/or revise entity data (e.g., data stored within the database 114 as described in FIG. 1). The applications may be hosted by the analytics server and/or hosted by a third party server.

At step 208, the analytics server may calculate network traffic value threshold associated with the identified at least one application. The analytics server may, upon identifying one or more applications needed to satisfy electronic request received at step 204, determine a network traffic value threshold needed for a remote electronic device to execute the identified applications. The network traffic value threshold may correspond to a minimum network traffic speed needed by an electronic device, such that the electronic device is able to efficiently execute the applications identified in step 206. To calculate this threshold, the analytics server may retrieve a network traffic value threshold for each identified application and may generate an overall network value threshold for an electronic device possibly executing the identified applications simultaneously or near simultaneously.

In an example, the analytics server may identify that in order to satisfy the requests received in step 204, a remote employee may need to execute Applications A, B, and C. The analytics server may then retrieve data associated with each identified application. For instance, the analytics server may retrieve a table that includes Applications A, B, and C and their corresponding network connectivity requirements. The table may describe a minimum download and/or upload speed required to efficiently execute each application. Based on the retrieve data, the analytics server may generate an overall network traffic value threshold corresponding to a minimum download and/or upload speed required to execute Applications A, B, and C.

At step 210, the analytics server may identify a first electronic device having a network traffic value that satisfies the calculated network traffic value threshold. The analytics server may calculate and/or determine a network traffic value for each electronic device operated by each remote employee in real time. For instance, the analytics server may ping each device to receive a network traffic value from each device.

Additionally or alternatively, the analytics server may calculate a network traffic value for each device based on historical trends and previous network/connectivity data observed. As described above, the analytics server may continuously and/or periodically determine network traffic value for each electronic device remote to the analytics server. Each device that is remote to the analytics server may represent an employee who is remote to the analytics server and may be employed to satisfy electronics request received, such as the electronic request received at step 204.

The analytics server may generate an electronic profile for each electronic device remote to the analytics server that indicates historical network traffic values monitored for each device. Using historical data, the analytics server may generate trends and estimations of the network traffic values for each electronic device. Using each electronic devices profile, the analytics server may calculate an estimated network traffic value for each electronic device. The analytics server may calculate the estimated network traffic value for each electronic device based on a timestamp of the electronic request received in step 204 and network traffic values of each electronic device within similar timeframe.

In a non-limiting example, the analytics server may query network traffic values monitored that correspond to a timestamp of the electronic request received. For instance, if the electronic request was received on a Tuesday at 4:30 PM, the analytics server may query each electronic device's profile to retrieve their respective network traffic values on Tuesdays between 4:30 PM and 5 PM. Based on previously monitored network traffic values, the analytics server may estimate the current network connectivity traffic for each electronic device. For instance, the analytics server may average network traffic values of each electronic device (within the same time frame) for the past month to estimate the current network traffic values.

The analytics server may analyze network traffic values of each electronic device and may identify electronic devices having a network traffic value that satisfy the network traffic value threshold calculated in step 208.

At step 212, the analytics server may route the electronic request to the identified first electronic device. The analytics server may then transmit the electronic request to the identified electronic device (step 210). The analytics server may establish an electronic communication session between the customer's electronic device and one or more electronic devices identified in step 210.

Figure 3A:
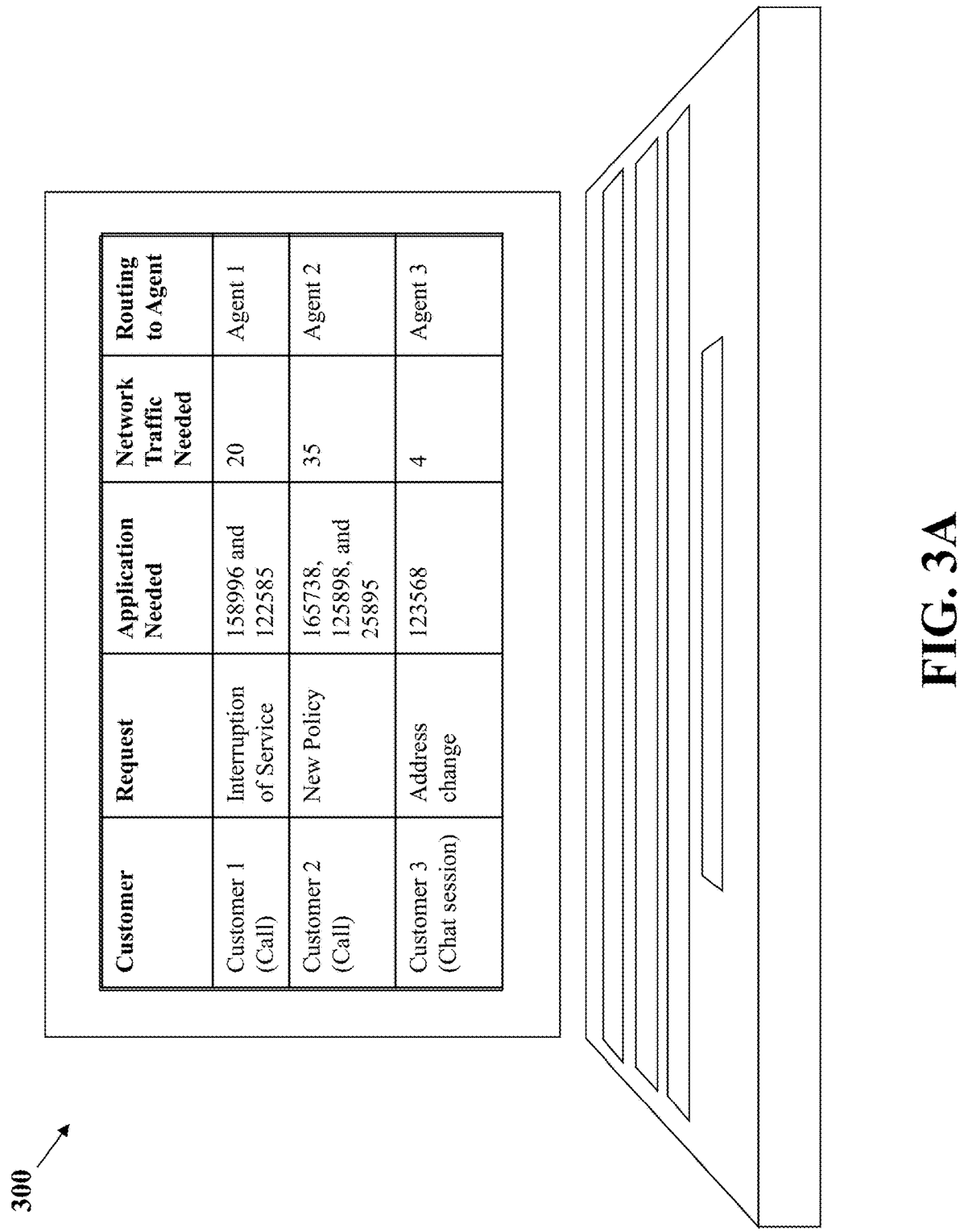
FIGS. 3A-C illustrate different graphical user interfaces displayed/generated by the intelligent routing system, in accordance with different embodiments.
Figure 3B:
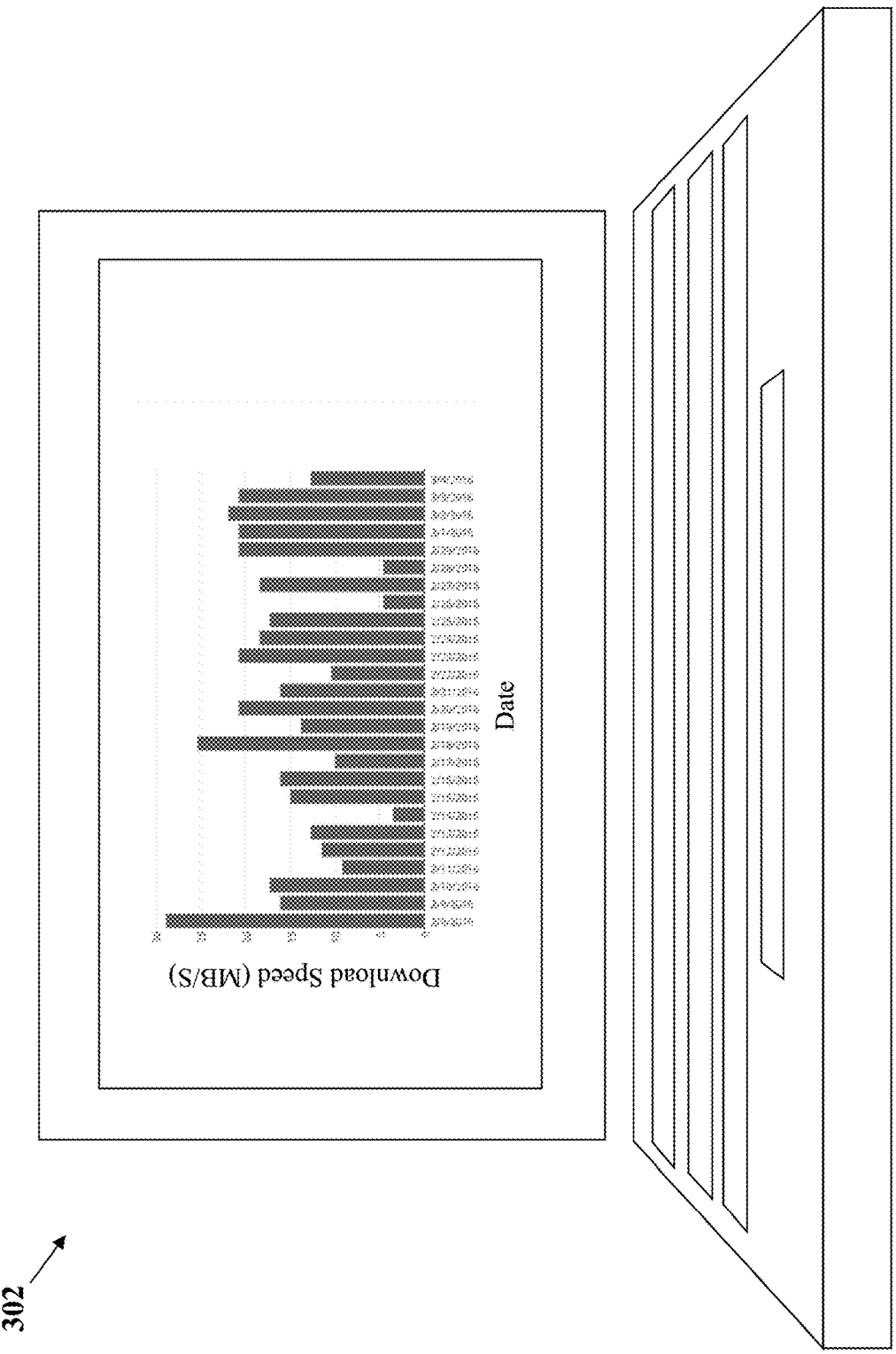
Figure 3C:
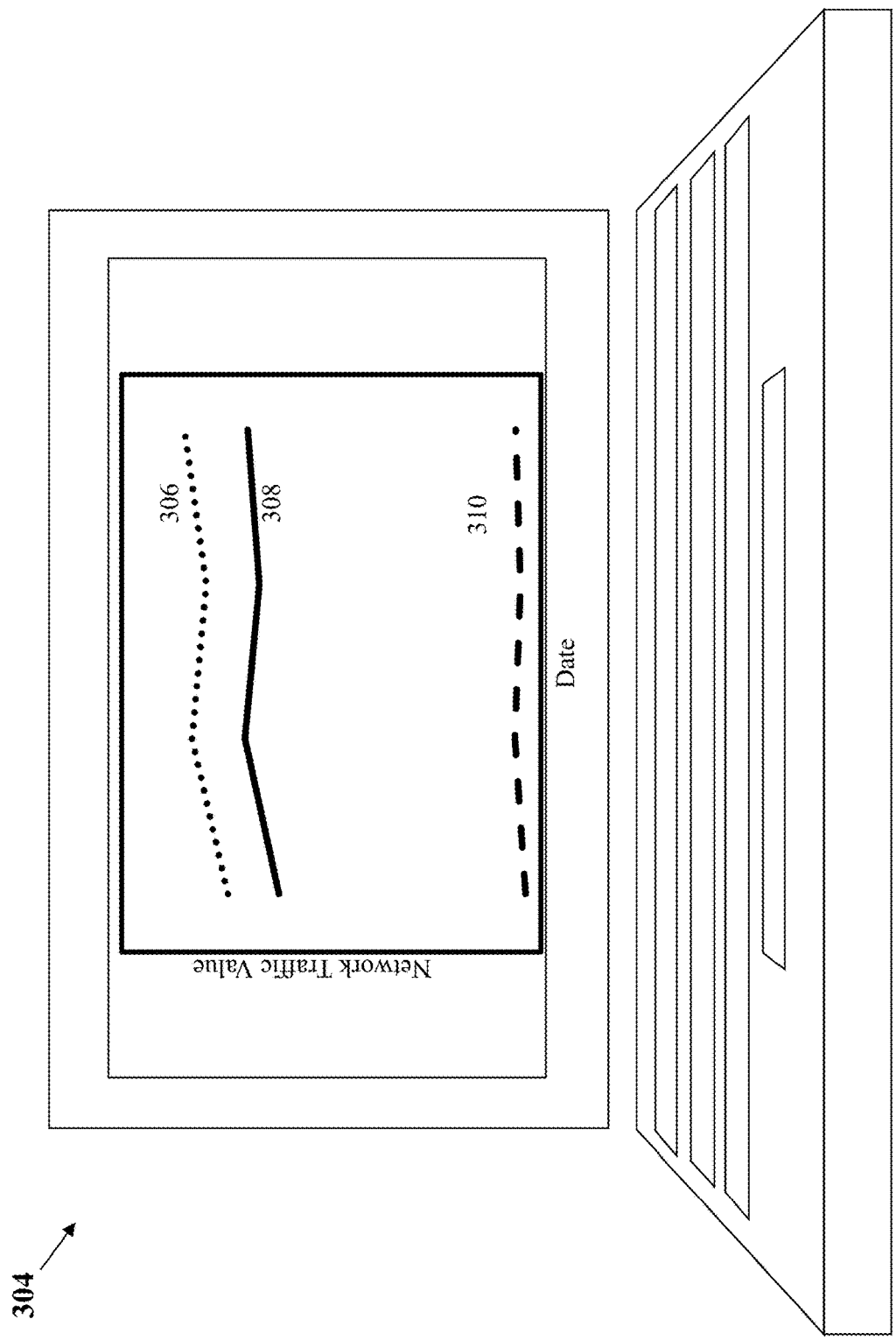

Additionally or alternatively to the method 200, the analytics server may also generate and revise a GUI that displays network traffic values of each electronic device. Referring now to FIGS. 3A-C, different GUIs generated and displayed by the analytics server are illustrated.

Referring now to FIG. 3A, the analytics server may display GUI 300 on a computing device, such as an administrator computing device. Using the GUIs depicted in FIGS. 3A-C, an administrator can view a status of electronic requests received and routed to different agents who are remote to the analytics server. The administrator can also manually override routing algorithms or any thresholds described herein using the GUIs depicted herein. For instance, the administrator can view different requests and responsible agents, trends and historical data illustrating network traffic values using the GUIs depicted herein. However, if the administrator does not agree with how a request is routed to an agent, the administrator can manually override the routing and/or remove the agent as a suitable option for routing, thereby the analytics may no longer route customer requests to said agent.

GUI 300 illustrates three electronic communication sessions with three different customers. GUI 300 also illustrates corresponding requests identified/determined for each customer, applications needed to satisfy the identified requests, network traffic needed to execute the identified applications, and an agent to which the analytics server has routed the customer's request.

For instance, GUI 300 illustrates that Customer 1 has established an electronic communication session with the analytics server. More specifically, Customer 1 has initiated a call to a call center hosted by the analytics server. The analytics server has identified service interruption as the reason for Customer 1's call. Consequently, the analytics server has identified application numbers 158996 and 122585 to be executed by an agent to identify reasons for the service interruption and/or rectify the problem. The analytics server also calculates a network traffic value needed to execute the identified applications. Based on the network traffic value needed, the analytics server has routed this call to Agent 1.

As depicted, Customer 2 has initiated a call to the call center to discuss a new policy. The analytics server identifies that an agent must execute multiple applications that require heavy network traffic. As a result, the analytics server routes this call to Agent 2 because Agent 2 is operating a remote computing device that has a higher network traffic value compared to Agent 1 or Agent 3. In contrast, because Customer 3 has contacted the analytics server using a chat session and is only requesting an address change, the analytics server calculates/estimates a lower network traffic value requirement. As a result, the analytics server routes this chat session to Agent 3. The administrator interacting with the GUI 300 may interact with the agent name and may manually route an electronic session to a different agent.

The administrator can also view historical network connectivity data associated with each agent. For instance, as depicted in FIG. 3B, the administrator may interact with the agent's name and the analytics server may display the GUI 302 where historical network connectivity data is presented. The administrator can customize and revise attributes shown in GUI 302. For instance, GUI 302 illustrates a particular agent's historical download speed. However, the GUI 302 can be revised, such that it shows upload speed, latency speed, and/or the overall network traffic value for one or more agents. Moreover, the administrator can customize the time window (date) showing the trends and/or values described herein.

Additionally or alternatively, the analytics server may also compare different agents and their respective network traffic values (or any other attribute requested by the administrator). For instance, as depicted in GUI 304, three agents and their respective connectivity trends are illustrated using trend 306, 308, and 310. In GUI 302, the X-axis represents time and the Y-axis represents network traffic value for each agent's remote electronic device. As depicted, the agent corresponding to the rend 310 suffers from significant network connectivity issues compares to the other agents. The administrator can use this chart to identify/notify the agent whose electronic device corresponds to the trend 310 and/or remove that agent from the list of available agents, such that the analytics server will no longer route calls and other electronic requests to him/her. The analytics server may revise the GUIs described herein in real time, such that the administrator can identify the most suitable option in real time and route the requests accordingly.

In one example, a customer calls a call center of an entity where the call center is hosted by an analytics server described herein. Upon receiving the call, the analytics server identifies the incoming phone number. The analytics server then queries an internal and/or external database and identifies an account associated with the caller. The analytics server also identifies that the caller has recently called regarding a service disruption. The analytics server then identifies two applications (software solutions) associated with service disruption requests. The analytics server then calculates that a computer executing the identified applications must at least have a download speed of 18 MB per second and an upload speed of 4 MB per second. The analytics server then sends a request to computing devices for all remote agents and retrieves a network traffic value for each remote computer operated by each remote agent. The analytics server then identifies Agent A as the only remote employee with the above described network connectivity speed. As a result, the analytics server routes the customers call to Agent A.

In another example, a customer calls a call center of an entity where the call center is hosted by an analytics server described herein. The analytics server uses IVR technology and prompts the customer to provide information regarding his/her request to be satisfied by a call center agent. The analytics server monitors the customer's input to the IVR prompts and identifies that the customer would like to change a beneficiary of his/her account. The analytics server then identifies an application (software solutions) associated with changing the beneficiary of accounts. The analytics server then calculates that a computer executing the identified application must at least have a download speed of 6 MB per second and then upload speed of 1 MB per second.

The analytics server then queries a profile of each electronic device operated by each remote agent. The analytics server retrieves network traffic values of each electronic device that correspond to the customers call (e.g., same day and same time as the customer's call). Based on historical data, the analytics server identifies Agent B as the only remote employee with the above described network connectivity speed. As a result, the analytics server routes the customers call to Agent B.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   generating, by a server for each remote electronic device within a set of remote electronic devices, a network traffic value corresponding to a volume and speed of data packets communicated between a network and each remote electronic device via at least one network routing device;
   upon establishing an electronic communication session with a customer device, receiving, by the server from the customer device, an electronic request to be routed to at least one electronic device within the set of electronic devices;
   identifying, by the server based on a customer account attribute associated with the customer device, at least one application to be executed to satisfy the electronic request;
   calculating, by the server, network traffic value threshold associated with the identified at least one application;
   identifying, by the server, a first remote electronic device having a network traffic value that satisfies the calculated network traffic threshold; and
   routing, by the server, the electronic request to the first remote electronic device.

2. The method of claim 1, wherein routing the electronic request to the first remote electronic device, comprises establishing, by the server, a second electronic communication session between the customer device and the first remote electronic device.

3. The method of claim 1, wherein the electronic communication session corresponds to a chat session.

4. The method of claim 3, wherein the server identifies the at least one application by analyzing content of the chat session.

5. The method of claim 1, wherein the electronic communication session corresponds to a call.

6. The method of claim 5, wherein the server identifies the at least one application by receiving an input from the customer device indicating an attribute of the electronic request.

7. The method of claim 1, wherein the network traffic value corresponds to at least one of a download speed, upload speed, and a latency of each remote electronic device.

8. The method of claim 1, further comprising:
displaying, by the server, a graphical user interface comprising:
a first indicator corresponding to the customer device, and
a second indicator corresponding to an agent operating the first remote electronic device.

9. The method of claim 1, further comprising:
displaying, by the server, a graphical user interface comprising a historical trend of network traffic values of each remote electronic device within a predetermined time window.

10. The method of claim 1, further comprising:
upon receiving an instruction indicating a second remote electronic device, establishing, by the server, a second communication session between the customer device and the second remote electronic device.

11. A system comprising:
a server comprising a processor and a non-transitory computer-readable medium containing instructions that when executed by the processor causes the processor to perform operations comprising:
generate, for each remote electronic device within a set of remote electronic devices, a network traffic value corresponding to a volume and speed of data packets communicated between a network and each remote electronic device via at least one network routing device;
upon establishing an electronic communication session with a customer device, receive, from the customer device, an electronic request to be routed to at least one electronic device within the set of electronic devices;
identify at least one application to be executed to satisfy the electronic request based on a customer account attribute associated with the customer device;
calculate network traffic value threshold associated with the identified at least one application;
identify a first remote electronic device having a network traffic value that satisfies the calculated network traffic threshold; and
route the electronic request to the first remote electronic device.

12. The system of claim 11, wherein routing the electronic request to the first remote electronic device, comprises establishing, by the server, a second electronic communication session between the customer device and the first remote electronic device.

13. The system of claim 11, wherein the electronic communication session corresponds to a chat session.

14. The system of claim 13, wherein the server identifies the at least one application by analyzing content of the chat session.

15. The system of claim 11, wherein the electronic communication session corresponds to a call.

16. The system of claim 15, wherein the server identifies the at least one application by receiving an input from the customer device indicating an attribute of the electronic request.

17. The system of claim 11, wherein the network traffic value corresponds to at least one of a download speed, upload speed, and a latency of each remote electronic device.

18. The system of claim 11, wherein the instructions further cause the processor to:
display a graphical user interface comprising:
a first indicator corresponding to the customer device, and
a second indicator corresponding to an agent operating the first remote electronic device.

19. The system of claim 11, wherein the instructions further cause the processor to:
display a graphical user interface comprising a historical trend of network traffic values of each remote electronic device within a predetermined time window.

20. The system of claim 11, wherein the instructions further cause the processor to:
upon receiving an instruction indicating a second remote electronic device, establish a second communication session between the customer device and the second remote electronic device.

* * * * *